United States Patent [19]

Steudler, Jr.

[11] Patent Number: 4,903,999
[45] Date of Patent: Feb. 27, 1990

[54] CLAMP FOR SECURING A FLEXIBLE HOSE TO A WATER PIPE FOR POULTRY, SMALL ANIMALS AND LIKE WATERING SYSTEMS

[75] Inventor: Frederick W. Steudler, Jr., New Providence, Pa.

[73] Assignee: Val Products, Inc., Bird-in-Hand, Pa.

[21] Appl. No.: 320,181

[22] Filed: Mar. 7, 1989

[51] Int. Cl.$^4$ ............................................. F16L 41/00
[52] U.S. Cl. .................................... 285/197; 285/243; 285/259
[58] Field of Search ................. 285/197, 243, 242, 259

[56] References Cited

U.S. PATENT DOCUMENTS

| | | | |
|---|---|---|---|
| 708,117 | 9/1902 | Bowers | 285/243 |
| 2,314,000 | 3/1943 | Lusher et al. | 285/259 X |
| 3,262,721 | 7/1966 | Knight | 285/242 X |
| 3,649,055 | 3/1972 | Nilsen | 285/197 |
| 3,711,130 | 1/1973 | Betzler | 285/259 X |
| 3,806,031 | 4/1974 | Olson | 285/197 X |
| 3,885,743 | 5/1975 | Wake | 285/197 X |
| 4,294,470 | 10/1981 | Tucker | 285/197 X |
| 4,624,487 | 11/1986 | Thalmann | 285/197 |
| 4,679,827 | 7/1987 | Law | 285/331 X |

FOREIGN PATENT DOCUMENTS

| | | | |
|---|---|---|---|
| 146408 | 1/1903 | Fed. Rep. of Germany | 285/243 |
| 1486484 | 6/1967 | France | 285/197 |
| 600086 | 3/1948 | United Kingdom | 285/242 |

*Primary Examiner*—Thomas F. Callaghan
*Attorney, Agent, or Firm*—Diller, Ramik & Wight

[57] ABSTRACT

A clamp for securing a flexible watering tube to a water pipe associated with a watering system for poultry and/or small animals, the clamp including a generally U-shaped saddle which embraces the exterior of a water pipe, a tubular stem projecting in a direction away from a convex outer surface of the saddle, a passage in the tubular stem, a passage of legs in diametrically opposite spaced relationship to each other, the tubular stem being located between the two legs and defining therewith a pair of gaps, the legs having projections directed toward projections of the tubular stem, and the latter projections bite into the watering tube when an end portion thereof is inserted into the gaps.

15 Claims, 1 Drawing Sheet

CLAMP FOR SECURING A FLEXIBLE HOSE TO A WATER PIPE FOR POULTRY, SMALL ANIMALS AND LIKE WATERING SYSTEMS

CROSS-REFERENCE TO RELATED APPLICATIONS

This application is an improvement of one aspect of the invention disclosed in Application Ser. No. 07/162,540 filed on Mar. 1, 1988 which issued into Letters Patent 4892061 on Jan. 9, 1990.

BACKGROUND OF THE INVENTION

It is conventional to provide floor watering systems for poultry, small animals and the like, and in the system disclosed in the aforementioned patent, a plurality of drinking troughs are each connected by a flexible watering tube to a water pipe. The watering trough includes a float which regulates the water flowing into the trough from the water pipe through the flexible watering tube and the water in the trough is thereby kept at a desired level as it is being depleted. This system is relatively straightforward and foolproof except for the fact that the flexible watering tubes tend to dislodge from the associated water pipes resulting in uncontrolled water flow which is totally unacceptable in the industry. (It is extremely desirable to maintain the excrement of the poultry or small animals as dry as possible for collection and, of course, to reduce odor.) The flexible watering tubes can be accidentally removed from the associated chip securing the same to the water pipe merely by being bumped by the poultry/small animals, particularly if originally installed carelessly without an associated conventional metallic ring clamp. If the installation is accomplished absent the conventional ring clamp, the inherent flexibility of the watering tube is the only force holding the watering tube upon the water pipe clip, and more often than not it will eventually release with attendant damage. The latter is likely to happen in older installations when the watering tubes, be they plastic or rubber, progressively lose their inherent flexibility over time. Irrespective of the cause of such flexible watering tube disengagement (be it through improper installation, old age, poultry/animal abuse, etc.), unless unattended in a relatively straightforward and economical fashion, the problems associated therewith (moist and odorous excrement) remain and have remained heretofore unsolved.

SUMMARY OF THE INVENTION

The present invention is directed to a novel clamp for securing a flexible watering tube to a water pipe for conducting water to a trough or similar watering device of a watering system for poultry and/or small animals. The clamp is preferably injection molded from polymeric/copolymeric plastic material, such as ABS plastic, reinforced polyethylene, or the like and includes a generally U-shaped saddle having an inner concave surface which embraces the exterior of an associated water pipe. A tubular stem projects outwardly from a convex surface of the U-shaped saddle and carries a plurality of axially spaced annular ridges or rings. A flexible watering tube is normally slipped upon this tubular stem and the opposite end of the watering tube is connected to the associated watering trough. Normally, the end of the flexible watering tube connected to the tubular stem can be secured thereto by a conventional metallic O-locking ring, but in keeping with the present invention such is totally eliminated and in lieu thereof the clamp has at least one though preferably two depending legs which are disposed in generally diametrical relationship to each other on opposite sides and in spaced relationship to the tubular stem. Each of these legs carries at least one inwardly directed barb, and when the flexible watering tube is slipped upon the stem, the barbs bite into the exterior surface of the watering tube to assure firm cooperative clamping to prevent the flexible tube from being inadvertently or accidentally disengaged from the tubular stem and thereby avoid the attendant water damage heretofore noted.

With the above, and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENT

Figure 1:
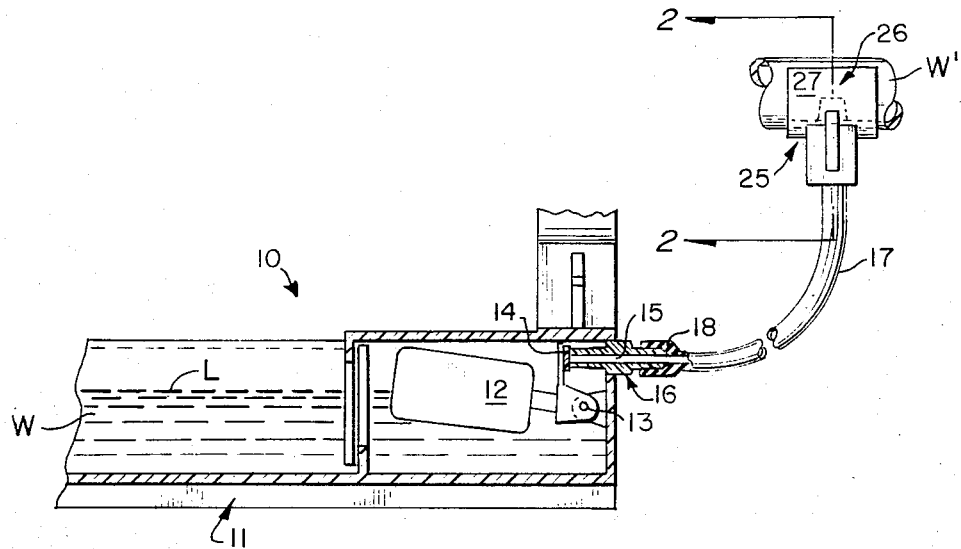
FIG. 1 is a fragmentary perspective view of a poultry and/or small animal watering system, and illustrates a trough having a float, a flexible tube between the trough and a water pipe, and a novel clamp of this invention securing the flexible watering tube to the water pipe.

A poultry or small animal watering system is illustrated in FIG. 1 of the drawings and is generally designated by the reference numeral 10. The watering system 10 is fully described in the earlier mentioned patent, and the details thereof are incorporated hereat by reference. However, for purposes of this invention it is sufficient to recognize that the watering system 10 includes a trough 11 into which water W flows and is maintained at a desired level L by a conventional float 12 pivotally connected at 13 and carrying a valve 14 which can open and close a passage 15 of a tubular fitting 16 carried by the trough 11. A flexible watering tube or hose constructed from plastic or rubber material is generally designated by the reference numeral 17 and has one end 18 connected to the fitting 16 and an opposite end 20 (FIGS. 2 and 5) connected to a novel clamp 25 of the present invention.

The novel clamp 25 is connected to a plastic water pipe W' having an opening O (FIG. 2) therein and includes a generally U-shaped saddle 26 defined by opposite curved arms 27, 28 each defining an interior surface 30 of a concave configuration and an exterior surface 31 of a convex configuration. The arms 27, 28 define an arc beyond 180°, as is readily apparent from FIG. 2, and hence must be spread apart before being slipped upon the water pipe W' and rebounding from the spread position thereof to the position shown in FIG. 2 under the inherent flexibility of the polymeric/copolymeric material thereof. However, before being assembled in the manner illustrated in FIG. 2, appropriate glue is utilized to both adhere the interior surface 30 to the exterior surface (unnumbered) of the water pipe W' and form a leak-proof seal therebetween. However, if necessary sealing compound or an O-ring seal can be utilized in the area of the opening O in a conventional manner.

Figure 2:
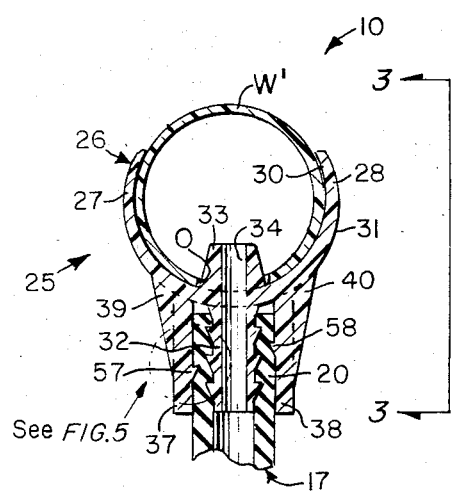
FIG. 2 is an enlarged fragmentary sectional view taken generally along line 2—2 of FIG. 1, and illustrates the manner in which the novel clamp of this invention is connected to the water pipe, and the flexible watering tube is connected to the clamp.

A tubular stem 32 projects downwardly from the exterior surface 31 while another tubular stem 33 projects upwardly away from the interior surface 30 and the tubular stems 32, 33 collectively define an axial water passage 34 which will deliver water from the water pipe W' into the flexible watering tube 17 in the manner clearly apparent from FIG. 2. The tubular stem 33 is preferably of a generally frusto-conical configuration to ease its insertion into the opening O during assembly of the clamp 25 with the water pipe W'.

The tubular stem 32 includes an exterior surface 35 which carries a plurality of axially spaced radially outwardly directed circumferential projecting means or ribs 36 having relatively sharp points or ends (unnumbered). To either of diametrically opposite sides of the tubular stem 33 there is disposed respective legs 37, 38 which are similarly in diametrically opposite relationship to each other and each collectively defines a space or a gap G with the exterior surface 35 of the tubular stem 32 into which the end portion 20 of the flexible hose 17 can be inserted. Each of the legs 37 is also reinforced by reinforcing means in the form of respective reinforcing ribs 39, 40 which extend from the exterior surface 31 of the respective arms 27, 28 toward but end short of terminal ends (unnumbered) of the legs 37, 38.

Figure 4:
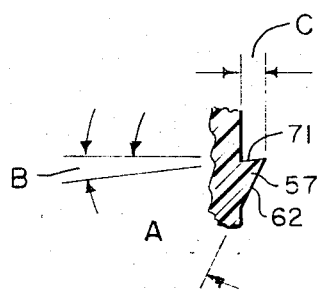
FIG. 4 is a highly enlarged cross sectional view taken through a barb carried by one of the legs for clamping the flexible watering tube to a tubular stem of the clamp.

Each of the legs 37, 38 carries at least one further projecting means 57, 58, respectively, which are axially offset from each other (FIG. 2) with each of the projecting means 57, 58, being disposed between a pair of the projecting means or sharp ended projecting rings 36, 36 of the tubular stem 32. The projecting means 57, 58 are relatively sharp barbs (see FIG. 4) which are defined by faces or surfaces 61, 62 (FIG. 4) defining therebetween an acute angle A of approximately 70°. The angle B of the face or surface 71 to the horizontal or normal to the axis (not shown) of the passage 34 and the stem 32 is generally 10°. The length C of the face or surface 61 is approximately 0.025''.

Figure 3:
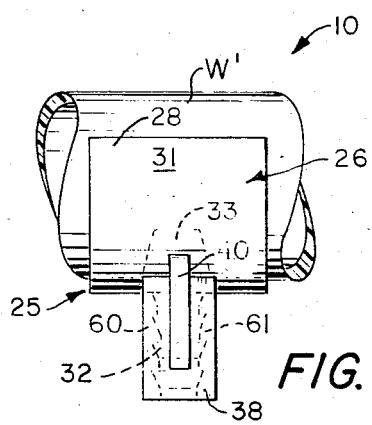
FIG. 3 is a side elevational view taken generally along line 3—3 of FIG. 2, and illustrates a reinforcing rib along one of a pair of diametrically opposite legs of the clamp.
Figure 5:
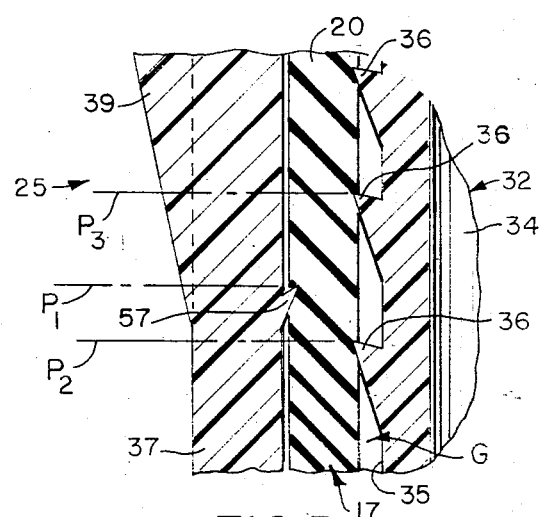
FIG. 5 is a fragmentary highly enlarged sectional view of the encircled portion of FIG. 2 and more clearly illustrates the manner in which the barb carried by the leg bites into and clamps the flexible watering tube in a gap between the leg and the tubular stem.

After the clamp 25 has been adhesively secured to the water pipe W', the flexible watering tube 17 is secured thereto by merely pushing the end 20 vertically upwardly, as viewed in FIGS. 2 and 3, which temporarily flexes the legs 37, 38 outwardly as the end portion 20 is progressively inserted into the gap G which, of course, in FIG. 5 is highly enlarged to illustrate and exaggerate the relationship of the components when the end portion 20 of the tube 17 has been fully inserted into the gap G. Once fully inserted the legs 37, 38 rebound to their normal position and contemporaneously therewith the barbs 57, 58 penetrate or bite into the exterior surface (unnumbered) of the tubing end portion 20. Similarly, the projecting pointed rings 36 also bite into the interior surface of the tubular stem 32, again as is illustrated in FIG. 5. It is to be particularly noted that the barb 57 (FIG. 5) lies in a radial plane P1 which is generally between planes P2, P3 of adjacent ring projections or ring barbs 36 of the tubular stem 32. Because of the latter the material of the end portion 20 between the planes P2, P3 tends to curve slightly in the longitudinal direction (not shown) and this increases the frictional purchase or bite between the barb 57 and the opposing ring barbs 37, 38 (FIG. 5). The same is, of course, true of the disposition of the barb 58 relative to the rings barbs 36 between which it is located, as is apparent from FIG. 2. Furthermore, the barbs 57, 58 are axially offset from each other, namely, the barb 57 is higher (FIG. 2) than the barb 58. Thus, clamping forces are applied to the tubing end portion 20 at two different locations creating greater gripping or clamping forces than would occur had, for example, the barbs 57, 58 been located in the same plane, as for example, both the barbs 57, 58 being located in the plane P1. Obviously, should the tubing 17 be accidentally bumped, pulled or pecked by animals and/or poultry, any downward force applied thereto tending to remove the end portion 20 from the tubular stem 32 would merely increase the clamping action created by the barbs 57, 58 and the opposing ring barbs 36. Accordingly, once the end portion 20 is inserted in external telescopic relationship to the tubular stem 32 between the legs 37, 38, as is best shown in FIG. 2, it is virtually impossible for the hose 17 to be inadvertently or accidentally withdrawn therefrom. However, should it be desired to remove the hose 17, it is to be appreciated that the diametrically opposite legs 37, 38 also set-off diametrically opposite slots or openings 60, 61 (FIG. 3) which extend the length of the legs from the outer surface 31 downwardly to the ends (unnumbered) of the legs 37, 38. Accordingly, a knife, razor or sharp instrument can be inserted into either or both of the slots 60, 61 and the end portion 20 can be cut or sliced along its length and then readily slipped laterally out from between the legs 37, 38 through either of the slots 60, 61. Thus, the end portion 20 of the hose 17 is readily assembled to the clamp 25, it is virtually impossible for the same to be inadvertently or accidentally disassembled, yet intentional disassembly in the manner just described is extremely expedient. Hence, the clamp 25 prevents the disadvantages heretofore mentioned attributable to disassembly of a hose from a water pipe while at the same time speeding assembly and disassembly of the clamp 25 with associated watering systems.

Although a preferred embodiment of the invention has been specifically illustrated and described herein, it is to be understood that minor variations may be made in the apparatus without departing from the spirit and scope of the invention as described in the appended claims.

I claim:

1. A clamp for securing a flexible watering tube to a water pipe comprising a body having a generally U-shaped saddle adapted to embrace the exterior of a water pipe, a tubular stem projecting in a direction away from an outer surface of said saddle, a passage in said tubular stem opening through an inner surface of said saddle, means projecting from an exterior surface of said tubular stem for gripping an interior surface of a flexible watering tube which is in exterior telescopic relationship to said tubular stem, at least one resilient leg circumscribing less than the total circumference of said tubular stem which is integral with and projects from said saddle outer surface in adjacent spaced relationship to said tubular stem thereby defining a gap for receipt of a flexible watering tube, and second projecting means and an inner surface of said one projecting leg defining a predetermined distance less than the wall thickness of a flexible watering tube sandwiched therebetween in external telescopic relationship to said tubular stem whereby the resilience of said one leg effects radial outward deflection during watering tube insertion upon said tubular stem and creates a radially inwardly directed clamping force against the inserted watering tube to clamp the inserted watering tube in the aforesaid sandwiched relationship.

2. The clamp as defined in claim 1 including second projecting means in the form of a barb projecting from said at least one resilient leg into said gap and toward said first-mentioned projecting means for cooperatively clamping the inserted water tube.

3. The clamp as defined in claim 1 wherein said first-mentioned projecting means is a ring projecting radially beyond an innermost exterior surface of said tubular stem.

4. The clamp as defined in claim 2 wherein said first-mentioned projecting means are disposed as at least a pair in axial spaced relationship along said tubular stem, and said barb is positioned between said axially spaced pair of first projecting means.

5. The clamp as defined in claim 2 including means on a side of said one leg opposite said second projecting means for reinforcing said one leg generally along the projecting length thereof.

6. The clamp as defined in claim 2 including means on a side of said one leg opposite said second projecting means for reinforcing said one leg generally along the projecting length thereof, and said reinforcing means is a reinforcing rib projecting from said outer surface toward a terminal end portion of said at least one leg.

7. The clamp as defined in claim 2 wherein said barb is defined by a pair of outer surfaces defining an acute angle therebetween, and one of said barb surfaces is disposed at an angle of generally ten degrees to a plane normal to an axis of said passage.

8. A clamp for securing a flexible watering tube to a water pipe comprising a body having a generally U-shaped saddle adapted to embrace the exterior of a flexible water pipe, a tubular stem projecting in a direction away from an outer surface of said saddle, a passage in said tubular stem opening through an inner surface of said saddle, means projecting from an exterior surface of said tubular stem for gripping an interior surface of a flexible watering tube which is in exterior telescopic relationship to said tubular stem, at least a pair of resilient legs each circumscribing less than the total circumference of said tubular stem which are integral with and project from said saddle outer surface in adjacent spaced relationship to said tubular stem whereby each defines a gap for receipt therein of a flexible watering tube, said legs being spaced from each other to define at least a pair of longitudinal slots, and second projecting means and an inner surface of each of said projecting legs define a predetermined distance less than the wall thickness of a flexible watering tube sandwiched therebetween in external telescopic relationship to said tubular stem whereby the resilience of said legs effects radial outward deflection during water tube insertion upon said tubular stem and creates a radially inwardly directed clamping force against an inserted watering tube to clamp the same in the aforesaid sandwiched relationship.

9. The clamp as defined in claim 8 including second projecting means in the form of a barb projecting from each leg into its associated gap and toward said first-mentioned projecting means for cooperatively clamping the inserted water tube.

10. The clamp as defined in claim 8 wherein said first-mentioned projecting means is a ring projecting radially beyond an innermost exterior surface of said tubular stem.

11. The clamp as defined in claim 9 wherein said first-mentioned projecting means are disposed as at least a pair in axial spaced relationship along said tubular stem, and said barb is positioned between said axial spaced pair of first projecting means.

12. The clamp as defined in claim 9 including means on a side of each of said legs opposite said second projecting means for reinforcing said legs generally along the projecting lengths thereof.

13. The clamp as defined in claim 9 including means on a side of said legs opposite said second projecting means for reinforcing said legs generally along the projecting lengths thereof, and said reinforcing means is a reinforcing rib projecting from said outer surface toward a terminal end portion of each of said legs.

14. The clamp as defined in claim 9 wherein each barb is defined by a pair of outer surfaces defining an acute angle therebetween, and one of said barb surfaces is disposed at an angle of generally ten degrees to a plane normal to an axis of said passage.

15. A clamp for securing a flexible watering tube to a water pipe comprising a body having a generally U-shaped saddle adapted to embrace the exterior of a water pipe, a tubular stem projecting in a direction away from a convex outer surface of said saddle, a passage in said tubular stem extending the length thereof and opening through a concave inner surface of said saddle, first means projecting from an exterior surface of said tubular stem for gripping an interior surface of a flexible tube in exterior telescopic relationship to said tubular stem, at least one leg projecting from said tubular stem exterior surface in adjacent spaced relationship to said tubular stem thereby defining a gap for receipt of a flexible tube, second means projecting from said at least one leg into said gap and towards said first projecting means for cooperatively clamping therewith a flexible tube disposed in said gap, a further leg disposed generally opposite from said first leg and projecting from said tubular stem exterior surface in adjacent spaced relationship to said tubular stem thereby defining a further gap for receipt of a plastic tube, further second means projecting from said further one leg into said further gap and toward said first projecting means for cooperatively clamping therewith a flexible tube disposed in said further gap, said first mentioned and further second projecting means is a barb, said first projecting means are disposed as at least a pair in axial spaced relationship along said tubular stem, said first-mentioned and further second projecting means is each positioned between said axially spaced pair of first projecting means, means on a side of each of said legs opposite the barbs thereof for reinforcing said legs generally along the projecting length thereof, and said reinforcing means is a reinforcing rib projecting from said convex outer surface toward a terminal end portion of its associated leg.

* * * * *